United States Patent Office 2,880,195
Patented Mar. 31, 1959

2,880,195

PROCESS FOR THE PREPARATION OF NITROGENOUS CONDENSATION PRODUCTS OF PHENOLS AND ALDEHYDES

Herbert Hentschel and Otto Sussenguth, Letmathe, Westphalia, Germany, assignors to Rutgerswerke-Aktiengesellschaft, Frankfurt am Main, Germany No Drawing. Application December 18, 1956
Serial No. 628,964

Claims priority, application Germany December 22, 1955

10 Claims. (Cl. 260—54)

This invention relates to the preparation of nitrogen-containing condensation products from phenols and aldehydes and it has particular relation to novel condensation products in which the nitrogen-containing compound used as a starting material forms part of the molecule in the condensation product.

It has been known from the art to use organic bases such as aniline, pyridine and others as a contact agent or catalyst in the preparation of resinous condensation products from phenols and aldehydes.

It has now been found that certain organic bases of the type described hereinafter can be used not only as catalysts or contact agents, but can be condensed with phenols and aldehydes, whereby the organic base participates in the condensation between phenols and aldehydes with the formation of products in which the organic base forms part of the molecule and which can be cured and converted into hardened resinous products.

It has been also found that the salt-like molecular compounds of phenols and quinoline, which have been known by themselves, easily take up formaldehyde in the form of methylol groups in the phenolic nucleus. The compounds thus formed by the action of formaldehyde have been found to be thermo-reactive, i.e. they are capable of polycondensation. Thereby hardening takes place with the incorporation of the quinoline molecule in the resulting resin.

The novel products of the present invention are distinguished by particular stability to alkali. As thermo-reactive resins resistant to alkali, hitherto resins have been used in which the phenolic hydroxyl group has been etherified for example by means of alpha-dichlorohydrin. Molded articles prepared from the condensation products of the present invention and wood flour as a filler have been found to have higher stability to alkali than molded articles prepared from ordinary phenol formaldehyde resins and wood flour under equal conditions. Heat-hardened products prepared from the condensation products of the present invention and asbestos fillers have shown no reduction of strength by a treatment with boiling aqueous solution of sodium hydroxide of 10%, for 30 hours, i.e. such products show the same resistance to alkali as products prepared under equal conditions from asbestos fillers and phenol formaldehyde resins etherified by means of alpha-dichlorohydrin. Thus alkali resistant resinous products can be prepared from an easily available starting material in a simple and economical manner.

The presence of bases in the condensation products of the invention reduces the velocity of splitting off of water from the methylol groups so that under relatively mild conditions the products formed in carrying out the invention remain first in mono-molecular or low-molecular condition and hardening or curing by heat takes place relatively slowly. This, however, does not equally apply if polyvalent phenols, such as resorcinol are used in carrying out the invention.

The molecular proportion between nitrogen-containing organic base, phenol and aldehyde can vary. It has been found that for one acid hydroxyl group one basic nitrogen atom is necessary, i.e. for example cresol and quinoline should be used in equi-molecular proportion. The formaldehyde can be used in amounts of 1–3 mols, based on 1 mol of the phenol. Depending on the individual reactants used, the formation of the product embodying the invention takes place generally in the temperature range between 0° and 100° C. The reaction can be carried out without the use of contact agents, but is catalyzed by small amounts of alkali. The reactions between the individual reactants take place almost quantitatively.

Some of the resinous products prepared from a phenol, formaldehyde and quinoline show particularly satisfactory electrical properties.

*Example 1*

1 mol of quinoline and 1 mol of cresol are heated to about 80° C. with 1–3 mols of formaldehyde (in 37% aqueous solution) and 5 grams of sodium hydroxyde under stirring for about 2 hours. The reaction mixture is then neutralized, for example with an acetic acid solution, subsequently washed with water and then dehydrated under reduced pressure. A red-brown oily reaction product is thus obtained in a yield of about 90%. It can be mixed with asbestos filler and hardened at 150° C., or mixed with wood flour and molded under pressure at 150° C.

*Example 2*

1 mol of quinoline, 1 mol of 3,5-dimethyl phenol and 2 mols of formaldehyde (in 37% aqueous solution) are heated to about 80° C. under stirring for 2 hours. A yellow-brown oil, which still contains water is thus obtained in almost quantitative yield. This resin can be processed either directly or after dehydration by distillation under vacuum.

*Example 3*

1 mol of phenol alcohol (saligenin) is dissolved in 1 mol of hot quinoline. The product thus obtained can be used directly for the production of molded articles, for example with the addition of fillers such as wood flour.

*Example 4*

1 mol of resorcinol, 1 mol of quinoline and 1 mol of formaldehyde (20% aqueous solution) are reacted under stirring and cooling with each other. The resulting reaction product solidifies at room temperature with the inclusion of water. For further processing, the still liquid reaction product is preferably used.

*Example 5*

1 mol of resorcinol is dissolved under heating in 2 mols of quinoline. Upon cooling a crystalline salt is formed which can be mixed with a filler, such as wood flour and with a hardening agent such as hexamethylenetetramine or hexamethylolmelamine.

*Example 6*

1 mol of isoquinoline and 1 mol of cresol are heated with 2¼ mols of formaldehyde (37% aqueous solution) and 5 grams of sodium hydroxyde to about 80° C. under stirring, for about 5 hours. Subsequently the reaction mixture is neutralized with acetic acid, washed with water and dehydrated by distillation under vacuum. A viscous dark brown product is thus obtained which can be cured or hardened by heat at 150° C.

*Example 7*

1 mol of quinaldine and 1 mol of cresol are heated with 2¼ mols of formaldehyde (37% aqueous solution)

and 5 grams of sodium hydroxyde to about 80° C. under stirring, for about 5 hours. Subsequently the reaction mixture is neutralized with acetic acid, washed with water and dehydrated by distillation under vacuum. A viscous dark brown product is thus obtained which can be cured or hardened by heat at 150° C.

Condensation products of the type here described can be obtained substantially in the manner described in the above Example 1–7, also from the following ingredients used in the molecular proportions stated above:

| Example | Phenolic Compound | N-containing Compound | Aldehyde |
| --- | --- | --- | --- |
| 8 | m-dichlorphenol | quinoline | formaldehyde. |
| 9 | 2,4'-dihydroxy diphenyl | do | Do. |
| 10 | phenol or cresol | do | a mixture of formaldehyde and furfural in the proportion 8:2. |

It will be understood that this invention is not limited to the specific materials, steps, proportions, conditions and other details specifically described above and can be carried out with various modifications. The alkaline catalyst can be neutralized by various acids, such as oxalic acid, sulphuric acid, or phosphoric acid.

In addition to sodium hydroxyde or its solutions, other alkaline reacting agents such as potassium hydroxyde, calcium hydroxyde, barium hydroxyde, or magnesium hydroxyde, can be used as catalysts. Without any catalyst cresol, quinoline, and formalin react when they are heated to about 80° C. for 14 hours. Dehydration of the reaction product by distillation can be carried out for example under a vacuum of 20 to 40 mm. Hg. In many cases it is even possible to carry out dehydration under atmospheric pressure. The amount of catalyst stated above in Examples 1 and 6 relates to gram-molecular amounts of the reactants. The reaction product obtained in the above Examples 2 or 4 can be further processed directly, i.e. by mixing it with a suitable filler, such as wood flour, or the reaction product can be first dehydrated by distillation under vacuum, then mixed with a filler and further processed in conventional manner. In the above Example 3 dissolution of the phenol-alcohol in the quinoline can be carried out for example at a temperature of 75° C. In the above Example 5 the quinoline may be heated to a temperature of 75° to 80° C. prior to or during dissolution therein of the resorcinol. Hardening or curing of the condensation products embodying the present invention can be carried out in conventional manner, e.g. by casting and subsequent heating or by heat and pressure which are preferably applied simultaneously. The hardening can be carried out at a temperature in the range of 150 to 165° C. The condensation products with wood flour as filler can be cured after rolling and mill mixing at a pressure of 200 kg./cm.$^2$ and 150–165° C. in the period of 5 to 10 minutes. The proportion of the filler in moldable compositions prepared from the condensation products of this invention depends primarily on the nature of the filler and the intended use of the molded product. Asbestos can be used e.g. in an amount of 50 to 65% by weight and wood flour e.g. in an amount of 40 to 60% by weight, based on the total weight of the moldable composition. The uncured condensation products prepared according to the invention are soluble in alkali, pyridine, ketones, alcohols, or esters. Upon subjecting the uncured products to heating, polycondensation takes place and upon continued heating hard, insoluble and infusible resinous materials are obtained. The product of above Example 3 is liquid at ordinary room temperature and can be further processed in conventional manner, e.g. by mixing it with wood flour on rollers and subsequent comminution in order to obtain a moldable composition. The products of the invention can be used for the preparation of moldable compositions, for the preparation of shaped products by casting and curing and also for the preparation of varnishes or the like. The cured products obtained from the condensation products of the present invention are distinguished by good mechanical and electrical properties and can be utilized e.g. in the form of varied molded articles, such as parts of tools, plates, rods, parts of electrical appliances and mechanical devices, such as stirrers. It will be also understood that instead of a single nitrogen-containing organic compound a mixture of several of these compounds can be used. A mixture of several alkaline catalysts can also be employed. It will be also understood that for the compounds specifically named above as reactants, homologues, analogues and derivatives, can be partly or entirely substituted, if such homologues, analogues and derivatives have the general chemical character of the reactant compounds specifically named above. The duration of the curing treatment depends primarily on the character of the respective condensation product, as well as on the temperature used in curing. In general, practically complete curing without application of pressure can be obtained in 6 to 24 hours if curing is carried out in the temperature range of 110 to 170° C.

In the present application the terms "phenol" and "phenols" are used to denote phenol of the formula $C_6H_5OH$, as well as analogous or homologous phenolic compounds which may contain one or more —OH groups. The term "cresol" is used herein to denote ortho-, meta-, or para-cresol or mixtures thereof. In the above examples the term "cresol" denotes a commercial mixture of isomeric cresols. The term "phenol alcohol" is used herein to denote saligenin, known also under the name salicylalcohol, but it will be understood that analogues or homologues of this compound can also be used in carrying out the invention, e.g. a mixture of liquid phenols alcohols (containing 25% of water) can also be mixed with quinoline in molar proportion at room temperature.

What is claimed is:

1. As a new condensation product, the reaction product of formaldehyde with a phenolic compound selected from the group consisting of phenol, cresols, xylenols, resorcinol, 2,4'-dihydroxydiphenyl, and dichlorophenols, and with a nitrogen-containing organic compound selected from the group consisting of quinoline, isoquinoline and quinaldine, said condensation product being capable of polycondensation and hardening to a hardened resinous product, the ratio of phenolic compound:nitrogen-containing organic compound:formaldehyde in the molecule being 1:(1–2):(1–3).

2. A new condensation product as claimed in claim 1, in which the ratio of phenolic compound:nitrogen-containing organic compound:formaldehyde in the molecule is 1:1:(1–3).

3. A new condensation product as claimed in claim 1, in which the ratio of divalent phenolic compound:nitrogen-containing organic compound:formaldehyde in the molecule is 1:2:(1–3).

4. A new condensation product as claimed in claim 1, of quinoline, cresol, and formaldehyde.

5. A new condensation product as claimed in claim 1, of quinoline, 3,5-dimethyl phenol and formaldehyde.

6. A new condensation product as claimed in claim 1, of resorcinol, quinoline and formaldehyde.

7. A new condensation product as claimed in claim 1, of cresol, isoquinoline, and formaldehyde.

8. A process for preparing new condensation products capable of polycondensation and curing, comprising reacting at elevated temperatures up to 100° C. formaldehyde in the presence of a catalyst with a phenolic compound selected from the group consisting of phenol, cresols, xylenols, resorcinol, 2,4'-dihydroxy-diphenyl, and dichlorophenols with formaldehyde and a nitrogen-containing organic compound selected from the group consisting of quinoline, isoquinoline and quinaldine, the ratio of phenolic compound:nitrogen-containing organic compound:formaldehyde in the molecule being 1:(1–2):(1–3).

9. A process as claimed in claim 8, in which the reaction is carried out in the presence of an alkaline catalyst.

10. A process as claimed in claim 8, in which the phenolic compound is reacted with formaldehyde in a first step and the resulting product is subsequently condensed with the nitrogen-containing organic compound.

References Cited in the file of this patent
UNITED STATES PATENTS

| | | |
|---|---|---|
| 2,010,773 | Burke et al. | Aug. 6, 1935 |
| 2,527,065 | Jones | Oct. 24, 1950 |
| 2,606,155 | Hill | Aug. 5, 1952 |

OTHER REFERENCES

Abraham: "Asphalts and Allied Substances," fourth edition; Van Nostrand Co., New York; January 1938; page 346 (copy in Division 50).